US008935524B1

(12) United States Patent
Lawrence

(10) Patent No.: US 8,935,524 B1
(45) Date of Patent: *Jan. 13, 2015

(54) SYSTEMS AND METHODS FOR MANAGING CERTIFICATES

(75) Inventor: Dale Graham Lawrence, Boerne, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/488,838

(22) Filed: Jun. 5, 2012

Related U.S. Application Data

(63) Continuation of application No. 11/744,166, filed on May 3, 2007, now Pat. No. 8,195,934.

(51) Int. Cl.
H04L 29/06 (2006.01)

(52) U.S. Cl.
USPC .......................................................... 713/156

(58) Field of Classification Search
CPC .... H04L 63/0823; H04L 9/3263; G06F 21/33
USPC ........................................... 713/156; 726/10
See application file for complete search history.

(56) References Cited

U.S. PATENT DOCUMENTS

| 6,233,577 | B1 | 5/2001 | Ramasubramani et al. | |
|---|---|---|---|---|
| 7,653,810 | B2* | 1/2010 | Thornton et al. | 713/158 |
| 2002/0129135 | A1* | 9/2002 | Delany et al. | 709/223 |
| 2004/0133775 | A1* | 7/2004 | Callas et al. | 713/153 |

OTHER PUBLICATIONS

"Managing SSL Security in Multi-Server Environments", VeriSign White Paper, 2005, 12 pgs.
"Microsoft Internet Information Server Security Overview", [online] [retrieved Mar. 15, 2007], Retrieved from the Internet: <URL: http://msdn2.microsoft.com/en-us/library/ms951692.aspx>, 9 pgs.
"Proactively Handling Certificate Expiration With SSL-Cert-Check", [online] [retrieved Mar. 19, 2007] Retrieved from the Internet <URL: http://prefetch.net/articles/checkcertificate.html>, 4 pgs.
"SSL Certificates HOWTO—Index", [online] [retrieved on Mar. 19, 2007]. Retrieved from the Internet <URL: http://tldp.org/HOWTO/SSL-Certificates-HOWTO/index.html> 1 pg.
"SSL Certificates Support" [online] VeriSign [retrieved on Mar. 19, 2007]. Retrieved from the Internet: <URL: http://www.verisign.com/support/ssl-certificates-support/backup-certificate.html>, 2 pgs.

* cited by examiner

*Primary Examiner* — Darren B Schwartz
*Assistant Examiner* — John B King
(74) *Attorney, Agent, or Firm* — Joseph A. Fuchs; Ungaretti & Harris LLP

(57) ABSTRACT

Systems and methods for managing certificates are described. A system comprises modules to receive requests related to a digital certificate, receive responses related to authorization of the digital certificate related to the requests, and store the requests and responses. A system comprises modules to communicate audit requests, receive responses related to the audit requests, and store the responses. A system comprises modules configured to communicate audit requests related to different certificate authorization entities, receive responses related to the audit requests, and store the responses. Other embodiments are described.

19 Claims, 6 Drawing Sheets

| CERTIFICATE CENTRAL | | | | | | | | | | |
|---|---|---|---|---|---|---|---|---|---|---|
| CERTIFICATE ASSET TRACKING | 806 808 810 | | | | | | | | | |
| SELECT A VIEW | NEW ITEM | FILTER | EDIT IN DATASHEET | | | | | | | | |
| ALL ITEMS | CERTIFICATE | KEYSTORE | TYPE | AUTHORITY | PLATFORM | SERVER/CELL | CERT REQ DT | LIVE DT | EXPIRE DT | CUSTOMER | STATUS | CONTACT |
| SELF-SIGNED | MOBILTEST.BANK.COM | MOBILETEST | SSL | VERISIGN | AIX | TEST | 12/9/2005 | 12/20/2005 | 12/20/2008 | MEMBERS | LIVE | JIM SMITH |
| 802 VERISIGN CERTIFICATES | SECUREMAIL | IBMKEYSTORE | 3DES | SELF-SIGN | AIX | WAS FARM | 8/30/2006 | 10/6/2006 | 10/6/2008 | MEMBERS | LIVE | TIM AARON |
| EXPIRE WITHIN 180 DAYS | EMEDIA.BANK.COM | VENDOR | SSL | SELF-SIGN | CISCO | VENDOR | 8/18/2006 | 8/18/2006 | 8/18/2007 | VENDORS | LIVE | IRENE WILSON |
| EXPIRE WITHIN 90 DAYS | TEST.BANK.COM | - | SSL | VERISIGN | LINUX | IHS FARM | 5/1/2000 | 5/1/2000 | 5/1/2001 | EMPLOYEES | EXPIRED | HAROLD KENT |
| ACTIONS | | | | | | 812 | | | | | |
| DEFINE ALERT | | | | | | | | | | | |
| APPROVE REQUEST | | | | | | | | | | | |
| 804 RESTORE CERTIFICATE | | | | | | | | | | | |
| EXPORT TO SPREADSHEET | | | | | | | | | | | |
| MODIFY SETTINGS | | | | | | | | | | | |

SYSTEMS AND METHODS FOR MANAGING CERTIFICATES

CROSS REFERENCES

This application is a continuation of U.S. patent application Ser. No. 11/744,166, filed May 3, 2007, now U.S. Pat. No. 8,195,934. This application is also related in subject matter to, and incorporates herein by reference in its entirety, each of the following: U.S. patent application Ser. No. 11/744,172, filed May 3, 2007; and U.S. patent application Ser. No. 11/744,174, filed May 3, 2007.

TECHNICAL FIELD

Various embodiments described herein relate generally to computer systems, and more particularly, but not by way of limitation, to systems and methods for managing certificates.

BACKGROUND

Wide-area networks, including world-wide networks, such as the Internet, have become essential tools for personal and business use. When communicating sensitive information, online businesses may use a variety of security methods to ensure that sensitive information is kept private. One such method includes the use of security certificates, also referred to as digital certificates. A security certificate can be used in several ways, for example to authenticate an online entity's identification or to encrypt a message's content or to ensure a message's integrity. In a business enterprise, a multitude of security certificates may be employed, making certificate administration burdensome and inefficient.

SUMMARY

Systems and methods for managing certificates are described. In an embodiment, a system comprises a first module configured to receive, at a certificate management system, a first request from a first requestor, wherein the first request is related to a digital certificate issued by a first certificate authorization entity; a second module configured to receive, at the certificate management system, a first response from the first certificate authorization entity, wherein the first response is related to authorization of the digital certificate related to the first request; a third module configured to receive, at the certificate management system, a second request from a second requestor, wherein the second request is related to a digital certificate issued by a second certificate authorization entity, and further wherein the first certificate authorization entity is different from the second certificate authorization entity; a fourth module configured to receive, at the certificate management system, a second response from the second certificate authorization entity, wherein the second response is related to authorization of the digital certificate related to the second request; and a fifth module configured to store the first and second requests and the first and second responses in a data store. In an embodiment, a system comprises a first module configured to communicate a first audit request to a first agent on a first platform; a second module configured to receive a first response from the first agent, wherein the first response comprises information related to the first audit request; a third module configured to communicate a second audit request to a second agent on a second platform; a fourth module configured to receive a second response from the second agent, wherein the second response comprises information related to the second audit request; and a fifth module configured to store the first and second responses in a data store, wherein the first and second platform are separate and distinct. In an embodiment, a system comprises a first module configured to communicate a first audit request related to a first certificate authorization entity; a second module configured to receive a first response comprising information related to the first audit request; a third module configured to communicate a second audit request related to a second certificate authorization entity; a fourth module configured to receive a second response information related to the second audit request; and a fifth module configured to store the first and second responses in a data store, wherein the first certificate authorization entity is different from the second certificate authorization entity. Other embodiments are described.

BRIEF DESCRIPTION OF THE DRAWINGS

FIG. 8 is an example of a graphical user-interface according to various embodiments.

DETAILED DESCRIPTION

The following detailed description includes references to the accompanying drawings, which form a part of the detailed description. The drawings show, by way of illustration, example embodiments. These embodiments, which are also referred to herein as "examples," are described in enough detail to enable those skilled in the art to practice aspects of the inventive subject matter.

In this document, the terms "a" or "an" are used, as is common in patent documents, to include one or more than one. In this document, the term "or" is used to refer to a nonexclusive or, unless otherwise indicated.

System Overview

Figure 1:
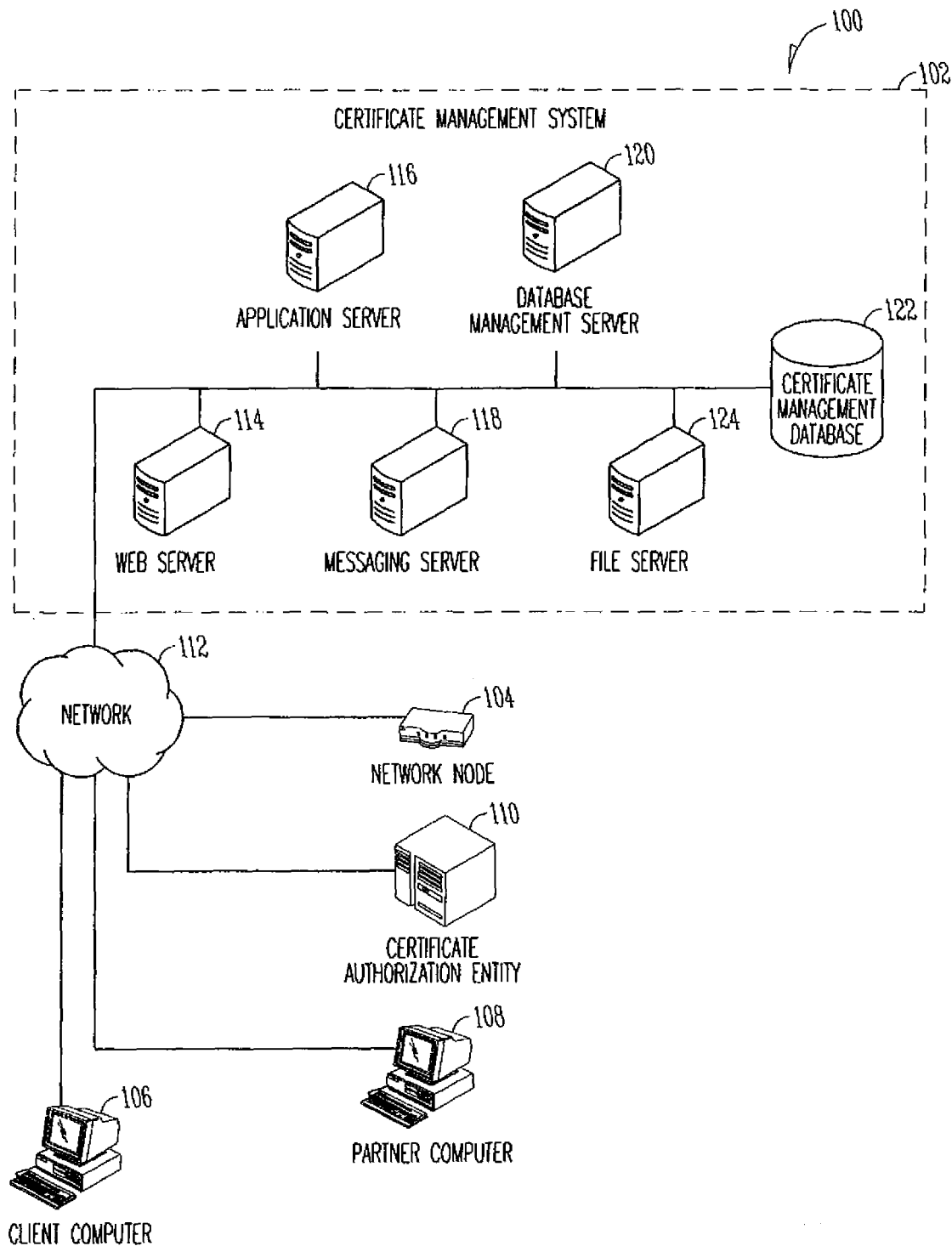
FIG. 1 is a schematic view of a computer network system according to various embodiments.

FIG. 1 is a schematic view of a computer network system 100 according to various embodiments. The computer network system 100 includes a certificate management system 102, a network node 104, a client computer 106, a partner computer 108, and a certificate authorization entity 110, communicatively coupled via a network 112. In an embodiment, the certificate management system 102 includes a web server 114, an application server 116, a messaging server 118, a database server 120, which is used to manage at least a certificate management database 122, and a file server 124. The certificate management system 102 may be implemented as a distributed system, for example one or more elements of the certificate management system 102 may be located across a wide-area network from other elements of the certificate management system 102.

The web server 114 may communicate with the file server 124 to publish or serve files stored on the file server 124. The web server 114 may also communicate or interface with the application server 116 to enable web-based presentation of information. For example, the application server 116 may consist of scripts, applications, or library files that provide primary or auxiliary functionality to the web server 114 (e.g., multimedia, file transfer, or dynamic interface functions). In addition, the application server 116 may also provide some or the entire interface for the web server 114 to communicate with one or more of the other servers in the certificate management system 102, e.g., the messaging server 118 or the database management server 120.

In various embodiments, the network node 104 may include network devices such as a firewall, a proxy server, a web server, a messaging server (e.g., an email server), a router, an Extensible Markup Language (XML) appliance (e.g., an XML firewall, an XML accelerator, or an XML gateway), or other such devices. A network node 104 may be located in a segmented area of the network 112, such as a demilitarized zone (DMZ), an intranet, or an extranet.

The certificate authorization entity 110 may include an internal or external certificate authority (CA). Examples of an external CA include VERISIGN, COMODO, THAWTE, and GO DADDY. Some systems may use an internal self-signed CA. Other systems may use a combination of internal and external CA's as root certificate providers. A CA may provide different types of certificates, such as lower-level encryption (e.g., 40 bit), higher-level encryption (e.g., 128 or 256 bit), or certificates that use extended validation (EV). A CA may also be configured to provide certificates for tailored uses, such as code-signing certificates or certificates for financial transactions.

The network 112 may include local-area networks (LAN), wide-area networks (WAN), wireless networks (e.g., 802.11 or cellular network), the Public Switched Telephone Network (PSTN) network, ad hoc networks, personal area networks (e.g., Bluetooth) or other combinations or permutations of network protocols and network types. The network 112 may include a single local area network (LAN) or wide-area network (WAN), or combinations of LAN's or WAN's, such as the Internet. The various devices coupled to the network 112 may be coupled to the network 112 via one or more wired or wireless connections.

The certificate management database 122 may include data to administer, track, audit, and provide reports on one or more certificates used in the system 100. For example, the certificate management database 122 may be structured to include some or all of the following information: a certificate identification (e.g., a domain name associated with a particular certificate), a certificate installation location, a certificate storage location (e.g., a keystore), a certificate type, a native management tool (e.g., IKeyMan, Microsoft Management Console (MMC)), a certificate authority (e.g., VERISIGN), an operating system platform (e.g., AIX, LINUX, SOLARIS, CISCO, MICROSOFT), an environment (e.g., development, test, production, research), a copy of the certificate or data that may be used to reconstruct the certificate, a certificate request date, a certificate requestor, a status, a work request number, and a contact personnel. The certificate management database 122 may be implemented as a relational database, a centralized database, a distributed database, an object oriented database, or a flat database in various embodiments.

In an embodiment, a user (not shown) at a client computer 106 may interface with the certificate management system 102, such as by using the web server 114, to request a certificate. The certificate may be for use on the client computer 106 or may be for use on another computer in the system 100, such as a business partner computer 108 or a network node 104. The request is recorded in the certificate management database 122. In an embodiment, the user may communicate the request to both the certificate management system 102 and the certificate authorization entity 110 in parallel. In such an embodiment, the certificate management system 102 is merely used to track the request and any resulting response. In an alternative embodiment, the user may communicate the request to certificate management system 102 and have the certificate management system 102 communicate the effective request to the certificate authorization entity 110. In such a configuration, the certificate management system 102 acts as a proxy on behalf of the user at the client computer 106. In another alternative embodiment, some requests may be sent directly to the certificate authorization entity 110 while others may be sent via proxy using the certificate management system 102. The route the request takes may be a function of the request type, the requestor, the certificate type requested, or the certificate authorization entity 110, in various embodiments. For example, a particular certificate type may have to be requested directly by the client computer 106. As another example, some requestors may not be allowed to request certificates directly, in which case, the certificate management system 102 may act as a proxy service.

After the request is submitted to the certificate authorization entity 110, a response is generated. Depending on the configuration, as described above, the response may be received solely by the certificate management system 102, which may then relay some or all of the content to the original requestor (e.g., the user at the client computer 106), or the response may be received at the requesting client computer 106, which may then relay some or all of the response to the certificate management system 102.

In an embodiment, a programmable agent resides on a computer on the network 112, such as on a network node 104 or a client computer 106. The programmable agent may be implemented as software or as programmable hardware, in various embodiments.

Figure 2:
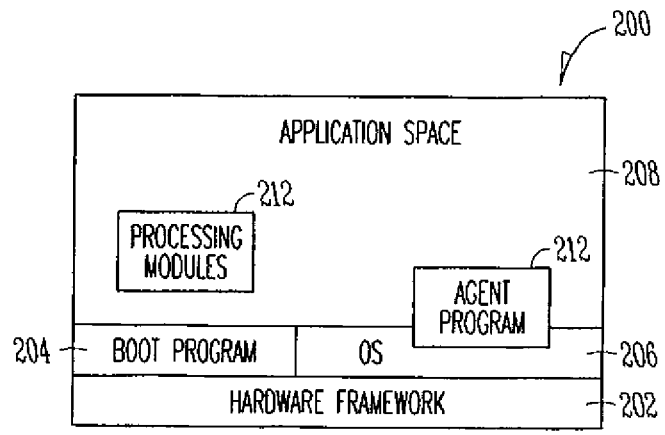
FIG. 2 is a block diagram of a computer architecture according to various embodiments.

FIG. 2 is a block diagram of a computer architecture 200 according to various embodiments. As shown in FIG. 2, the computer architecture 200 includes a hardware framework 202, a boot program 204, an operating system 206, and an application space 208 that includes one or more processing modules 210. In addition, the computer architecture 200 includes an agent program 212.

In various embodiments, the hardware framework 202 may include a thin-client, thick-client, or some intermediate derivation. The hardware framework 202 may also be configured to provide a virtual client. The boot program 204 may include a basic input/output system (BIOS) or other initialization program that works in conjunction with the operation system 206 to provide a software interface to the hardware platform 202. The agent program 212 may be implemented as an operating system service (e.g., daemon), a library file, or an application residing in the application space 208, in various embodiments. The agent program 212 may be configured to trap, or intercept, particular system calls or application commands. The agent program 212 may also be implemented as a shell, wrapping around another program, such as a key management tool, in an embodiment. When the agent program 212 is implemented as a shell, a user may knowingly use the agent program 212 to interface with the underlying program or the shell may be implemented in a such a way that the user is unaware of the agent program's use, for example, by using aliases, callback functions, or other methods.

During operation, the agent program 212 may be configured to interface with other tools on the computer architecture 200, such as web service tools, key management tools, or other configuration management tools. For example, when a certificate signing request (CSR) is generated by a user using a key management tool (e.g., IKeyMan, MMC), the agent program 212 may intercept the command used and then forward the CSR to the certificate management system 102, the certificate authorization entity 110, or both. Similar to the functionality described above, the agent program 212 may be configured to communicate the CSR to either the certificate management system 102 or the certificate authorization entity 110 depending on one or more rules, which may be based on the request type, the requestor, the certificate type requested, or the intended certificate authorization entity 110, in various embodiments. Other rules may be derived and used using different business decisions. In an embodiment, when the agent program 212 is configured to communicate the CSR directly to the certificate authorization entity 112, the agent program 212 may also communicate a notification message to the certificate management system 102, so that the certificate management system 102 may keep its records up to date.

In other embodiments, the agent program 212 may be configured to interface with tools on the computer architecture 200 to query the status, condition, identity, or other details of assets, such as certificates, installed or associated with the computer architecture 200. For example, an audit request may be issued from the certificate management system 102 to an agent program 212 on a network node 104. The agent program 212 may query software or hardware sources and determine the number, identity, and status of certificates installed or associated with the network node 104. For example, the agent program 212 may issue a command to a key management tool (e.g., MMC or IKeyMan) to query a data source (e.g., a registry or keystore) and obtain details about certificates under the key management tool's control. In an embodiment, the agent program 212 may be configured to query more than one key management tool or more than one certificate data source.

In other embodiments, the agent program 212 may be used to backup or restore a certificate on an associated computer architecture 200. For example, during an audit, information may be collected that would allow a system to restore the certificate if the certificate was damaged, lost, or otherwise inaccessible because of computer failure, a lost password, a corrupted data store, or other error conditions. A restore process may be automated, in part or in full, using the agent program 212, in various embodiments.

Tracking and Brokering Requests

Figure 3:
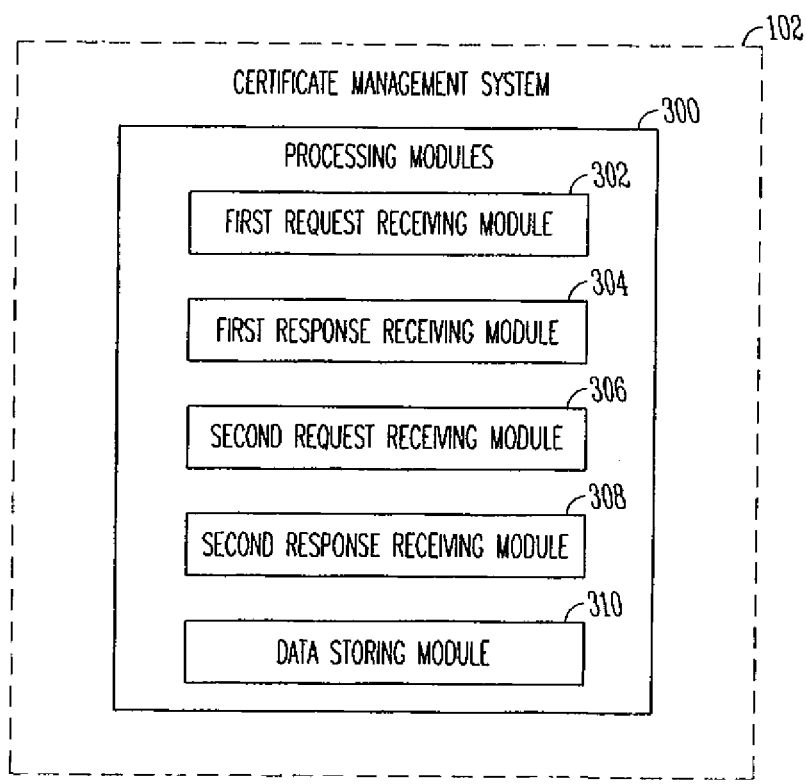
FIG. 3 is a block diagram of processing modules of the certificate management system shown in FIG. 1 according to various embodiments.
Figure 4:
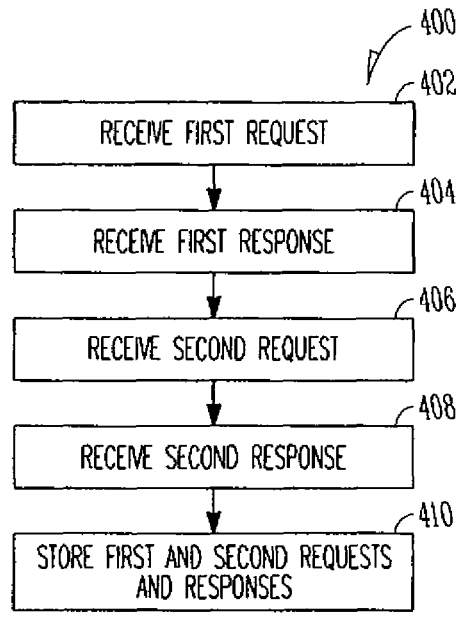
FIG. 4 is a flowchart illustrating a method according to various embodiments.

In various embodiments, the certificate management system 102 may be used to track, broker, and proxy certificate signing requests (CSR). FIGS. 3 and 4 generally describe systems and processes that may perform such tasks. In some embodiments, processes are implemented as instructions on computer-readable medium.

FIG. 3 is a block diagram of processing modules 300 of the certificate management system 102 shown in FIG. 1, according to various embodiments. The processing modules 300 include a first module 302 to receive a first request from a first requestor for a first certificate, a second module 304 to receive a first response from a first certificate authorization entity, a third module 306 to receive a second request from a second requestor for a second certificate, a fourth module 308 to receive a second response from a second certificate authorization entity, and a fifth module 310 to store the first and second requests and the first and second responses in a data store.

The first module 302 receives a first request from a first requestor for a first certificate. In an embodiment, the requested first certificate is to be issued by a first certificate authorization entity. In an embodiment, the first request is formatted using a standardized interface language. For example, the first request may be formatted using XML.

The second module 304 receives a first response from a first certificate authorization entity. The first response may include a certificate. The certificate may include information, such information about the user, computer, or network device that holds the private key corresponding to the issued certificate; information about the certificate authorization entity; the public key of the certificate's associated public-private key pair; the names of algorithms or encryption schemes supported by the certificate; a list of X.509 extensions included in the issued certificate; and other information concerning the validity or revocation of the certificate. The certificate may be formatted using standard protocol formats, such as X.509v1, X.509v2, or X.509v3.

Similar to the first module 302, the third module 306 receives a second request from a second requestor for a second certificate. In an embodiment, the requested second certificate is to be issued by a second certificate authorization entity. In a further embodiment, the second certificate authorization entity is different from the first certificate authorization entity.

Similar to the second module 304, the fourth module 308 receives a second response from a second certificate authorization entity.

The fifth module 310 stores the first and second requests and the first and second responses in a data store. The fifth module 310 may communicate with the first, second, third, or fourth modules 302, 304, 306, 308 at the time each request or response is received by the respective module, in various embodiments. In another embodiment, the fifth module 310 may muster one or more requests, or one or more responses and store the mustered data in at approximately the same time. In an embodiment, the data store is included in the certificate management database 122. In an embodiment, the data store is included in a configuration management database. In various embodiments, some or all of an issued certificate extracted from a response and stored in the data store. In an embodiment, information used to reconstruct a copy of the issued certificate is stored in the data store. For example, instead of storing the certificate's details, a certificate's location may be stored in the data store. The certificate's location may be offline, such as on a floppy disk or other removable media, or may be in a higher secure area online, such as a key store.

FIG. 4 is a flowchart illustrating a method 400 according to various embodiments. At 402, a first request is received, the first request being from a first requestor for a first certificate from a first certificate authorization entity. In an embodiment, the first requestor is a user. For example, the user may initiate the request using a web interface, such as described above, or via other means. In an alternate embodiment, the first requestor is a software program. The software program may be an automated process, such as during a scheduled renewal process to renew soon to be expired certificates, or it may be triggered, such as when an agent program interfaces with a key management tool, as described above.

At 404, a first response is received, the first response being from the first certificate authorization entity and related to the authorization of the first certificate. Depending on the type or content of the first response, additional processes may inform the requestor of the certificate's request status. In an embodiment, the user is notified using the messaging server 118 by means of email, voice mail, voice over IP, pager, instant message, text messaging (e.g., short message service), or the like.

At 406, a second request is received, the second request being from a second requestor for a second certificate from a second certificate authorization entity, where the second certificate authorization entity is different than the first authorization entity. For example, the first request may be for a certificate issued by VERISIGN and the second request may be for a certificate issued by GO DADDY.

At 408, a second response is received, the second response being from the second certificate authorization entity and related to the authorization of the second certificate.

At 410, some or all of the first and second requests and responses are stored in a data store. To track and provide audit information to users of the certificate management system 102, in some embodiments, additional information may be stored, such as a time and date stamp.

In another embodiment, the first request may be submitted from a first platform and the second request may be submitted from a second platform, such that the first platform is different from the second platform. In an embodiment, a platform may include a hardware component, a software component, an operating system component, and an environment component. For example, a PC running a MICROSOFT WINDOWS operating system and Internet Information Services (IIS) in a development environment is a distinct platform. In other embodiments, a platform may be described using a subset of the components described or with other components, such as an intended use (e.g., domain controller, firewall, web server, email server, application server, etc.) either alone or in combination.

In another embodiment, the method 400 may also comprise communicating the first request to the first certificate authorization entity; and communicating the first response to the first requestor. In such a configuration, the first requestor may hand off the requesting duties to a separate entity or process, such as the certificate management system 102, as described above. After the request is submitted, one or more responses may be communicated back to the requestor. The response may be communicated to the requestor using a messaging method, such as by using the messaging server 118. Alternatively, the responses may be stored in the certificate management system 102, for example in the certificate management database 122, for presentation to the user at a later time. The presentation may be implemented using the web server 114.

In another embodiment, the method 400 may also comprise approving the first request before communicating the request to the first certificate authorization entity. In an embodiment, the first request is presented to a user of the certificate management system, who may then provide an approval decision, and depending on the approval decision, the request may be approved or denied. The status of the approval decision may be stored in the certificate management system 102 for later reference. In an embodiment, more than one user approval is needed to approve a certificate request. A simple majority may be used in some embodiments, whereas in other embodiments, a unanimous approval vote is needed. In some embodiments, approval is automatic depending on the source of the request. For example, if the request originated from a high-level administrative user, then an approval process may be deemed redundant and unneeded. As another example, if the request originated from a development environment, where an erroneous or ill-advised issued certificate may do less harm, then the approval process may be omitted or compressed. In an embodiment, approval is automatic depending on the certificate authorization entity. For example, internally signed certificates may not need an approval process. So, certificate requests for internal certificates may be automatically approved.

In another embodiment, the method 400 may also comprise mustering a group of requests until the number of requests reaches a threshold amount; and communicating the group of requests to a certificate authority as a bulk order. In some cases, it may be advantageous to the business to order certificates in bulk. For example, it may be more cost effective or be easier to track the resulting assets. The threshold amount may be configurable to any number of a variety of different parameters. For example, the threshold may be dependent on the certificate authorization entity, the certificate type, or the certificate's intended usage. Other business concerns may be addressed by setting the threshold at an appropriate value.

In another embodiment, the method 400 may also comprise extracting data from the first response; and storing the extracted data in a configuration management system, wherein the extracted data comprises information used to reconstruct a copy of the requested digital certificate. In an embodiment, the extracted data comprises a copy of the requested digital certificate.

In another embodiment, the method 400 may also comprise extracting a digital certificate from the first response; and storing the digital certificate in a keystore. In addition, in an embodiment, the location of the digital certificate may be stored in the certificate management system 102 for later reference.

Auditing Processes

Figure 5:
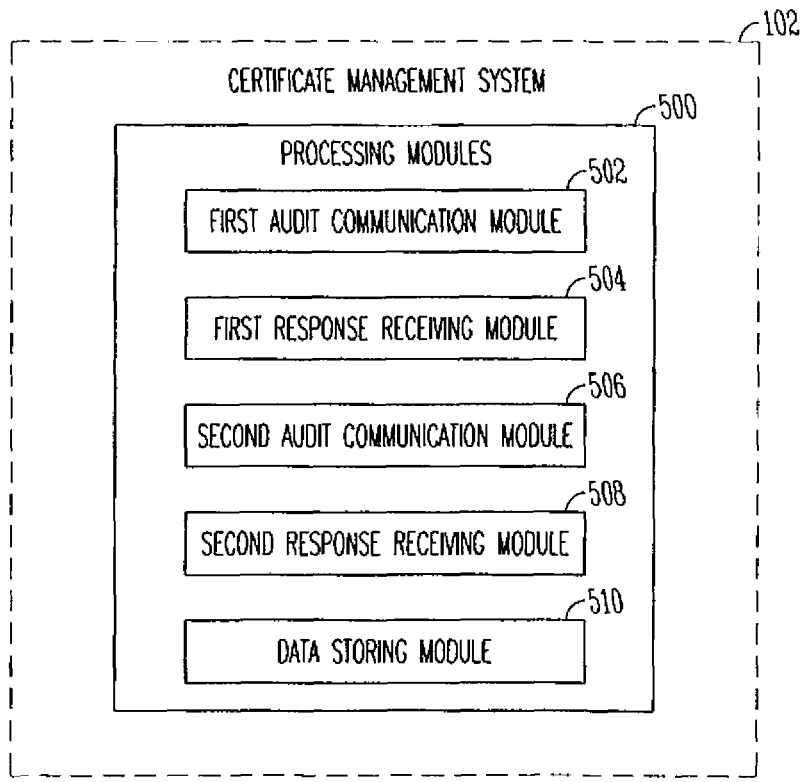
FIG. 5 is a block diagram of processing modules of the certificate management system shown in FIG. 1 according to various embodiments.
Figure 6:
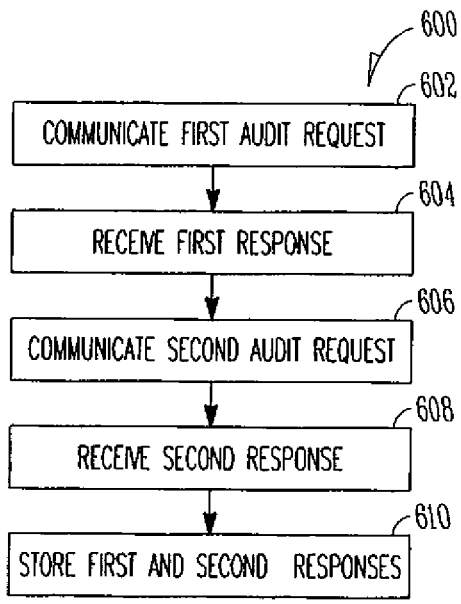
FIG. 6 is a flowchart illustrating a method according to various embodiments.

In various embodiments, the certificate management system 102 may be configured to audit certificate status, usage, and other details related to certificates. FIGS. 5 and 6 generally describe systems and processes that may perform such tasks. In some embodiments, processes are implemented as instructions on a computer-readable medium.

FIG. 5 is a block diagram of processing modules 500 of the certificate management system 102 shown in FIG. 1, according to various embodiments. The processing modules 500 include a first module 502 to communicate a first audit request, a second module 504 to receive a first response, a third module 506 to communicate a second audit request, a fourth module 508 to receive a second response, and a fifth module 510 to store the first and second responses in a data store.

The first module 502 communicates a first audit request. In an embodiment, the first audit request may be communicated to a first agent on a first platform. In an embodiment, the audit request includes a digital certificate audit request. The digital certificate audit request may be formatted or contain instructions to direct the focus of the first agent to inventory, capture, or audit information related to digital certificates. In an embodiment, the audit request may contain instructions to determine a particular value, such as an expiration date or a number of certificates installed or active on the first platform. In an embodiment, the audit request may be formatted using a standardized interface language. In a further embodiment, the standardized interface language includes XML. In an embodiment, the audit request is transmitted using remote procedure calling (RPC) or other distributed programming methods. In an embodiment, the first audit request is related to a first certificate authorization entity.

The second module 504 receives a first response. In an embodiment, the first response is from the first agent. In an embodiment, the first response is related to the first audit request. For example, in various embodiments, the first response may include data describing at least one of a status of a certificate, an identification of a certificate, a location of a certificate, a usage of a certificate, or a history of a certificate.

The third module 506 communicates a second audit request. In an embodiment, the second audit request is communicated to a second agent on a second platform. Similar to the first module 502, communication of the second audit request may be performed using a standardized interface language or RPC, in various embodiments. In an embodiment, the second platform is separate and distinct from the first platform. For example, the first audit request may be directed to a PC-compatible machine running MICROSOFT WINDOWS and IIS, whereas the second audit request may be directed to a HEWLETT-PACKARD (HP) 9000 server computer running HP-UX and IBM HTTP SERVER. In another embodiment, the second audit request is related to a second certificate authorization entity. In a further embodiment, the second certificate authorization entity is different from the first certificate authorization entity. For example, the first audit request may be directed to obtaining information related to certificates issued by VERISIGN, whereas the second audit request may be directed to obtaining information related to certificates issued internally (self-signed).

The fourth module 508 receives a second response. In an embodiment, the second response is from the second agent. In an embodiment, the second response is related to the second audit request. Information describing assets on or associated with the second platform are included in the second response. For example, assets, such as security certificates, may be inventoried, catalogued, or audited by the second agent on the second platform and a summary report may be provided as a portion of the second response.

The fifth module 510 stores the first and second responses in a data store. The fifth module 510 may communicate with the first, second, third, or fourth modules 502, 504, 506, 508 at the time each request or response is received by the respective module, in various embodiments. In another embodiment, the fifth module 510 may muster one or more requests, or one or more responses and store the mustered data in at approximately the same time. In an embodiment, the data store is a configuration management system. By combining an asset tracking system (e.g., certificate management system 102) and a configuration management system, auditing, tracking, and managing assets may be more efficient and thorough.

FIG. 6 is a flowchart illustrating a method 600 according to various embodiments. At 602, a first audit request is communicated, the first audit request being communicated to a first agent. In an embodiment, the first agent is on a first platform. In a further embodiment, the first audit request is related to a first certificate authorization entity. In an embodiment, the first audit request includes a digital certificate audit request.

In an embodiment, the first audit request includes a plurality of network locations and the first audit request is communicated to at least one network location in the plurality of network locations. In such a configuration, instead of all audit requests originating from a single machine one at a time, audit requests are grouped by network locations and distributed across a network. For example, a network address space may be divided among several audit requests. Then each audit request may be distributed and propagated to the network addresses in the audit request, until all network addresses have been queried and audited.

In an embodiment, the first audit request includes a plurality of certificate locations and the first audit request is communicated to at least one certificate location in the plurality of certificate locations. For example, certificates that are associated with unique domain names may be located and audited by their location in a distributed manner similar to that described above.

At 604, a first response is received, the first response being from the first agent. In an embodiment, the first response includes information related to the first audit request. For example, in various embodiments, the first response may include data describing at least one of a status of a certificate, an identification of a certificate, a location of a certificate, a usage of a certificate, or a history of a certificate. In a further embodiment, the first response includes rollup data describing a plurality of certificates associated with a plurality of platforms. For example, after audit requests are propagated through a network, responses may be back-propagated and aggregated until a combined response representing every responding network node is received.

At 606, a second audit request is communicated, the second audit request being communicated to a second agent. In an embodiment, the second agent is on a second platform. In a further embodiment, the second audit request is related to a second certificate authorization entity.

At 608, a second response is received, the second response being from the second agent. In an embodiment, the second response includes information related to the second audit request.

At 610, the first and second responses are stored in a data store. In an embodiment, the data store is associated with a configuration management system. In an embodiment, the method 600 also comprises storing the first and second requests in the data store.

In another embodiment, the method 600 may also comprise analyzing at least one of the first response or the second response to determine a certificate expiration date; determining whether the certificate expiration date is within a threshold time range; and raising an alert when the certificate expiration date is within the threshold time range. In an embodiment, the threshold time range is a function of a certificate lifespan. For example, a certificate set to expire two years after issue may have a threshold time range of two months, or one-twelfth. In another embodiment, the threshold time range is a static value. For example, any certificate with an initial lifetime over one year will be assigned a threshold time range of two months. In various embodiments the alert is communicated to a user using the messaging server 118 via at least one of an email, a notification message on a user-interface (e.g., provided by web server 114), a text message, a phone call, a voice message, a cellular communication, an internet communication, a pager communication, or otherwise.

In another embodiment, the method 600 may also comprise determining whether automatic certificate renewal is authorized; and automatically renewing the certificate when automatic renewal is authorized. In an embodiment, a user (e.g., an administrator) may use a user-interface, such as one provided by the web server 114, to control the certificate management system 102 and set whether to automatically renew a particular certificate. In an embodiment, when the time for renewal is determined, the certificate management system 102 may communicate with the appropriate certificate authorization entity 110 and renew the certificate.

User-Interfaces

Figure 7:
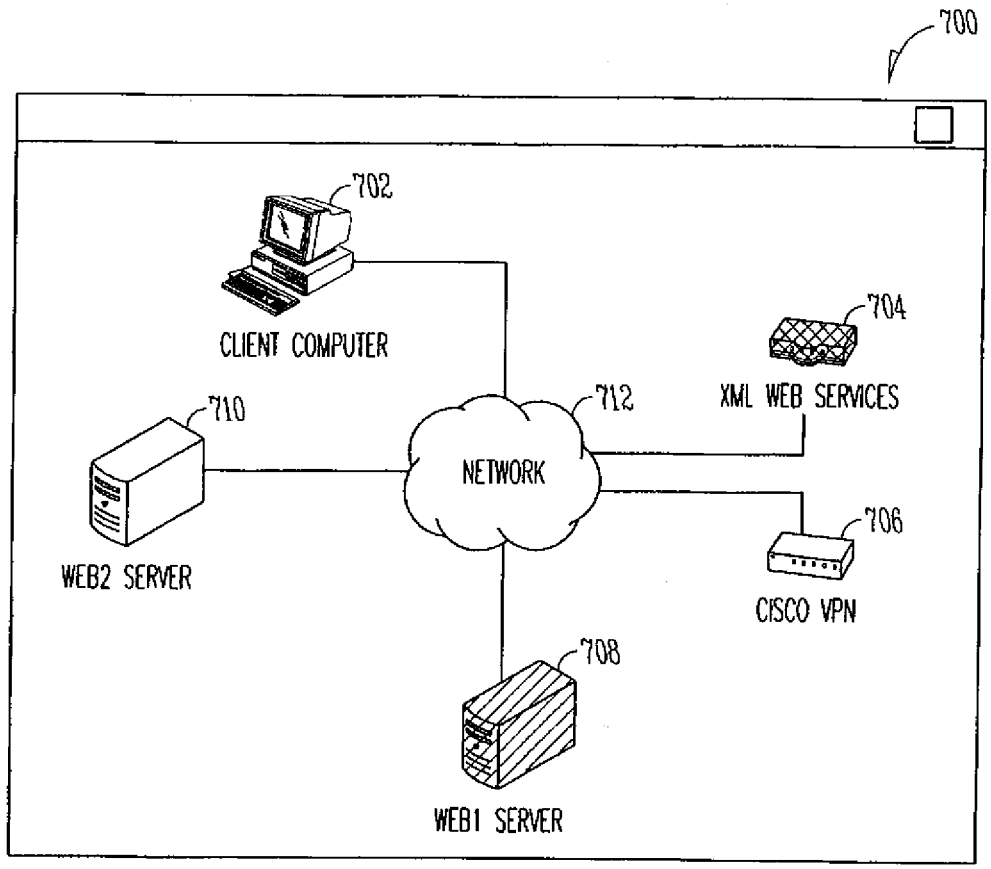
FIG. 7 is an example of a user-interface displaying a graphical network topology according to various embodiments.

In various embodiments, the certificate management system 102 may be configured to provide graphical interfaces that describe the identity, status, and other related information of certificates in an enterprise network system. FIGS. 7 and 8 describe two examples of user-interfaces that may be implemented in a graphical user-interface, such as a web browser or other suitable graphical interface.

FIG. 7 is an example of a user-interface 700 displaying a graphical network topology according to various embodiments. The network topology includes a client computer 702, an XML web services appliance 704, a CISCO VPN computer 706, a WEB1 server 708, and a WEB2 server 710, all connected via a network 712. In the example shown, one or more graphical indications may be used to indicate a certificate's status. For example, the certificate associated with the WEB1 server 708 is nearing expiration (e.g., within 60 days) and is past its threshold date. As such, the WEB1 server 708 icon is displayed using a color or shading (e.g., yellow) to indicate the associated certificate's status. As a further example, the certificate associated with the XML web services appliance 704 is critically near its expiration date (e.g., within 30 days) and a corresponding color or shading (e.g., red) is used to indicate its status. Other elements may be included in the user-interface 700, such as controls to pan, scroll, or zoom the displayed interface to allow a user to view an enterprise network at various levels of detail. In addition, related sections of the network may be grouped into a combined unit to efficiently display a certificate's status, such as when each server in a server farm is using a copy of the same certificate.

FIG. 8 is an example of a graphical user-interface 800 according to various embodiments. The user-interface 800 includes view controls 802, action controls 804, a new item control 806, a filter control 808, an edit control 810, and a data view 812.

In an embodiment, the view controls 802 include textual or graphical hyperlinks that upon activation, present further user-interfaces (e.g., screens) that control the information displayed in the data view 812. For example, by activating the "Verisign Certificates" view, a user would be presented with certificates that are associated with the Authority of "Verisign." In a further embodiment, the user may define views and control which views are available to particular users.

In an embodiment, the action controls 804 include controls that allow a user to control, configure or manage a certificate management system. In the example depicted in FIG. 8, a group of actions are illustrating, including a control to define alerts, approve requests, restore a certificate, export data to a spreadsheet, and modify settings. In an embodiment, controls are classified as user actions or administrative actions. For example, some actions may be made available to any user of the user-interface 800, such as "Export to Spreadsheet," while other actions may only be available to administrative users, such as "Approve Request" or "Restore Certificate."

The new item control 806 may be used by a user to create a new record in a certificate management system, to be displayed in the user-interface 800. The new record may be stored, for example, in the certificate management database 122. In an embodiment, using the new item control 806 allows a user to generate a certificate request and appropriate user-interfaces may be presented to the user to guide the user through the request process.

The filter control 808 may be used to filter the data shown in the data view 812. In an embodiment, a filter may be saved as a new view and the new view may be accessed from the view controls 802.

The edit control 810 may be used to edit a record, as displayed in the data view 812. Access to the edit control 810 may be limited to administrative users. In an embodiment, a subset of information associated with a certificate may be edited. For example, the certificate authority information may be read-only, whereas the contact name may be editable.

Hardware and Software Platform

Figure 9:
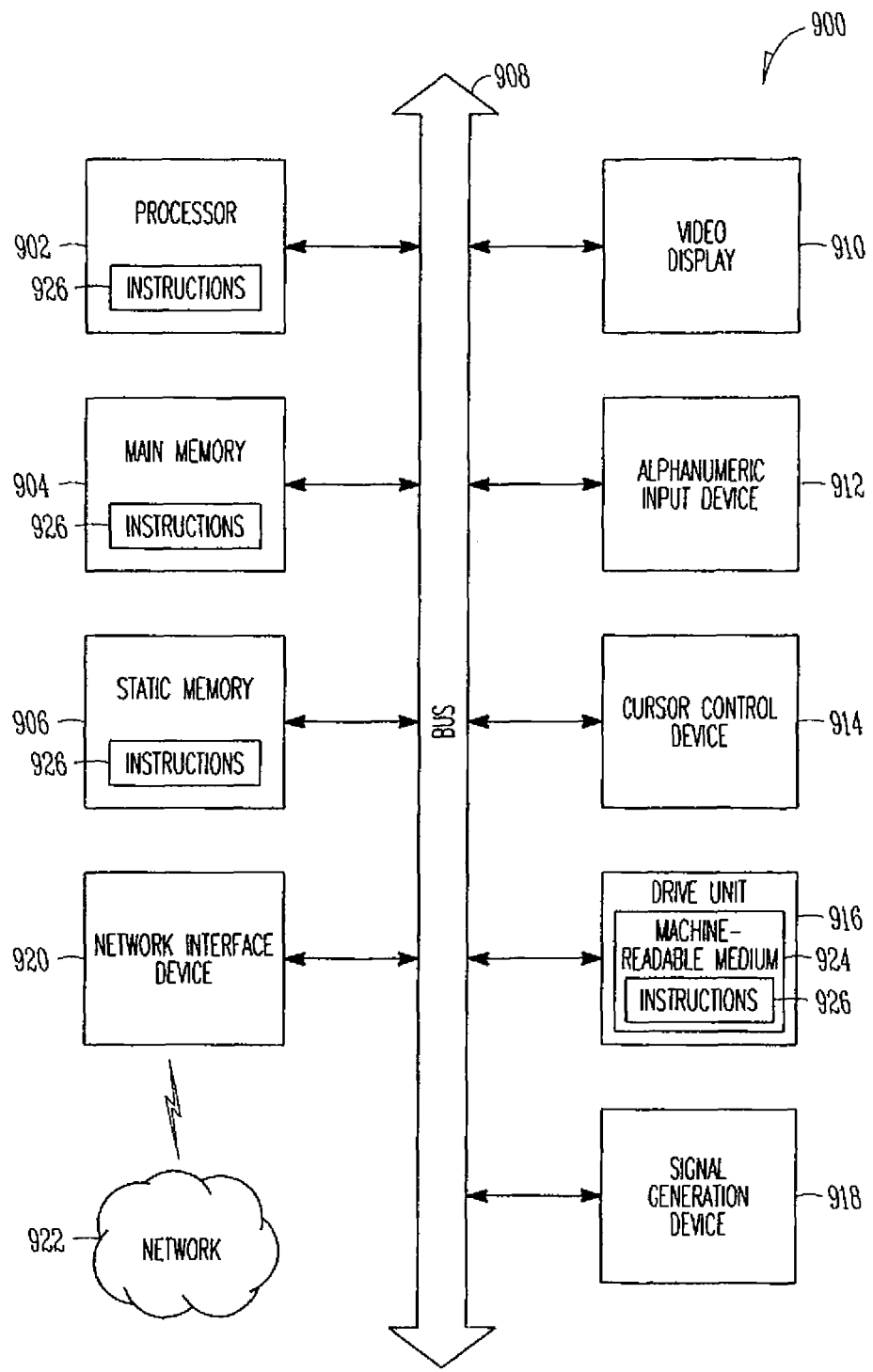
FIG. 9 is a block diagram illustrating a machine in the example form of a computer system, within which a set or sequence of instructions for causing the machine to perform any one of the methodologies discussed herein may be executed, according to various embodiments.

FIG. 9 is a block diagram illustrating a machine in the example form of a computer system 900, within which a set or sequence of instructions for causing the machine to perform any one of the methodologies discussed herein may be executed, according to various embodiments. In alternative embodiments, the machine may comprise a computer, a network router, a network switch, a network bridge, Personal Digital Assistant (PDA), a cellular telephone, a web appliance, set-top box (STB) or any machine capable of executing a sequence of instructions that specify actions to be taken by that machine.

The computer system 900 includes a processor 902, a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a cursor control device 914 (e. g., a mouse), a disk drive unit 916, a signal generation device 918 (e.g., a speaker) and a network interface device 920 to interface the computer system to a network 922.

The disk drive unit 916 includes a machine-readable medium 924 on which is stored a set of instructions or software 926 embodying any one, or all, of the methodologies described herein. The software 926 is also shown to reside, completely or at least partially, within the main memory 904 and/or within the processor 902. The software 926 may further be transmitted or received via the network interface device 920.

For the purposes of this specification, the term "machine-readable medium" or "computer-readable medium" shall be taken to include any medium which is capable of storing or encoding a sequence of instructions for execution by the machine and that cause the machine to perform any one of the methodologies. The terms "machine-readable medium" or "computer-readable medium" shall accordingly be taken to include, but not be limited to, solid-state memories, optical and magnetic disks, and other temporary, transient, or permanent storage means, such an executable streaming downloadable program. Further, it will be appreciated that the software could be distributed across multiple machines or storage media, which may include the machine-readable medium.

Method embodiments described herein may be computer-implemented. Some embodiments may include computer-readable media encoded with a computer program (e.g., software), which includes instructions operable to cause an electronic device to perform methods of various embodiments. A software implementation (or computer-implemented method) may include microcode, assembly language code, or a higher-level language code, which further may include computer-readable instructions for performing various methods. The code may form portions of computer program products. Further, the code may be tangibly stored on one or more volatile or non-volatile computer-readable media during execution or at other times. These computer-readable media may include, but are not limited to, hard disks, removable magnetic disks, removable optical disks (e.g., compact disks and digital video disks), magnetic cassettes, memory cards or sticks, random access memories (RAM's), read only memories (ROM's), and the like.

Such embodiments of the inventive subject matter may be referred to herein individually or collectively by the term "invention" merely for convenience and without intending to voluntarily limit the scope of this application to any single invention or inventive concept, if more than one is in fact disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate preferred embodiment.

In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims.

What is claimed is:

1. A system comprising:
a first module to receive, at a key management system, a first request from a first requestor, wherein the first request is related to a digital certificate issued by a first certificate authorization entity;
a second module to receive, at the key management system, a first response from the first certificate authorization entity, wherein the first response is related to authorization of the digital certificate related to the first request;
a third module to receive, at the key management system, a second request from a second requestor, wherein the second request is related to a digital certificate issued by a second certificate authorization entity, and further wherein the first certificate authorization entity is different from the second certificate authorization entity;
a fourth module to receive, at the key management system, a second response from the second certificate authorization entity, wherein the second response is related to authorization of the digital certificate related to the second request;
a fifth module to store the first and second requests and the first and second responses in a data store and analyze at least one of the first or second responses to determine whether automatic certificate renewal is authorized based on a selectable setting, and automatically renew the digital certificate related to the at least one of the first or second responses upon determining automatic renewal is authorized for the at least one of the first or second responses; and
a graphical user interface configured to allow a user to set an alert to advise of when a certificate has expired, to set a threshold date of expiration earlier than a lifespan associated with a certificate, to provide authorization for the automatic renewal of a certificate, to display a network topology of a plurality of servers with a graphical representation of one server from the plurality of servers bearing an indication of a status of a certificate for the one server.

2. The system of claim 1, wherein the first request is submitted from a first platform and the second request is submitted from a second platform, and further wherein the first platform is different from the second platform.

3. The system of claim 1, further comprising:
a sixth module to communicate the first request to the first certificate authorization entity; and
a seventh module to communicate the first response to the first requestor.

4. The system of claim 1, wherein the fifth module approves the first request before communicating the request to the first certificate authorization entity.

5. The system of claim 1, wherein the fifth module further comprises:
presenting the first request to a user of the key management system upon determining automatic renewal is not authorized.

6. The system of claim 4, wherein the fifth module determines whether a certificate expiration date of at least one of the first response or the second response is within a threshold time range, and raises an alert when the certificate expiration date is within the threshold time range.

7. The system of claim 1, further comprising:
an eighth module to extract data from the first response; and
a ninth module to store the extracted data in a configuration management system, wherein the extracted data comprises information used to reconstruct a copy of the requested digital certificate.

8. A computer implemented method comprising using one or more processors to perform:
receiving, at a key management system, a first audit request from a first requestor, wherein the first audit request is related to a digital certificate issued by a first certificate authorization entity;
receiving, at the key management system, a first response from the first certificate authorization entity, wherein the first response is related to authorization of the digital certificate related to the first audit request;
receiving, at the key management system, a second audit request from a second requestor, wherein the second audit request is related to a digital certificate issued by a second certificate authorization entity, and further wherein the first certificate authorization entity is different from the second certificate authorization entity;

storing, the digital certificate issued by the first certificate authorization entity and the digital certificate issued by the second certificate authorization entity in a keystore;

receiving, at the key management system, a second response from the second certificate authorization entity, wherein the second response is related to authorization of the digital certificate related to the second audit request;

storing the first and second audit requests and the first and second responses in a data store;

providing a graphical user interface configured to allow a user to set an alert to advise of when a certificate has expired, to set a threshold date of expiration earlier than a lifespan associated with a certificate, and to provide authorization for the automatic renewal of a certificate; and displaying on the graphical user interface a network topology of a plurality of servers with a graphical representation of one server from the plurality of servers bearing an indication of a status of a certificate for the one server.

9. The method of claim 8, wherein the first audit request comprises a digital certificate audit request.

10. The method of claim 8, wherein at least one of the first or second audit requests include a plurality of network locations, and further wherein at least one of the first or second audit requests are communicated to at least one network location in the plurality of network locations.

11. The method of claim 8, wherein at least one of the first or second audit requests include a plurality of certificate locations, and further wherein at least one of the first or second audit requests are communicated to at least one certificate location in the plurality of certificate locations.

12. The method of claim 8, wherein at least one of the first or second responses include rollup data, wherein the rollup data describes a plurality of certificates associated with a plurality of platforms.

13. The method of claim 8, wherein the first response comprises information related to the first audit request.

14. The method of claim 13,
wherein the information related to the first audit request comprises data describing at least one of: a status of a certificate, an identification of a certificate, a location of a certificate, a usage of a certificate, and a history of a certificate.

15. A non-transitory computer-readable medium including instructions stored thereon that are executable by a processor to:
receive, at a key management system, a first request from a first requestor, wherein the first request is related to a digital certificate issued by a first certificate authorization entity;
receive, at the key management system, a first response from the first certificate authorization entity, wherein the first response is related to authorization of the digital certificate related to the first request;
receive, at the key management system, a second request from a second requestor, wherein the second request is related to a digital certificate issued by a second certificate authorization entity, and further wherein the first certificate authorization entity is different from the second certificate authorization entity;
store the digital certificate issued by the first certificate authorization entity and the digital certificate issued by the second certificate authorization entity in a plurality of keystores;
receive, at the key management system, a second response from the second certificate authorization entity, wherein the second response is related to authorization of the digital certificate related to the second request;
store the first and second requests and the first and second responses in a data store;
automatically approve the first request before communicating the first request to the first certificate authorization entity;
provide a graphical user interface configured to allow a user to set an alert to advise of when a certificate has expired, to set a threshold date of expiration earlier than a lifespan associated with a certificate, to provide authorization for the automatic renewal of a certificate, and a graphical representation of a plurality of servers with at least one graphical representation of one server bearing indicia of a status of a certificate for the one server; and
automatically renew the digital certificate upon determining automatic renewal is authorized.

16. The computer-readable medium of claim 15, wherein the digital certificate issued by the first certificate authorization entity and the digital certificate issued by the second certificate authorization entity comprise certificate data, wherein the certificate data comprises data identifying a certificate name, a certificate type, an issuing authority for the certificate, a type of platform the certificate supports, an expiration date of the certificate, and a validity status.

17. The computer-readable medium of claim 16, wherein the validity status comprises at least one of a live indicator or an expired indicator corresponding to the validity status of the digital certificate issued by the first certificate authorization entity.

18. The computer-readable medium of claim 15, wherein the plurality of keystores are of at least two different and distinct keystore types, and wherein the digital certificate issued by the first certificate authorization entity and the digital certificate issued by the second certificate authorization entity are different types of certificates.

19. The computer-readable medium of claim 15, wherein the instructions executable to automatically approve the first request comprise instructions executable to:
analyze at least one of the first or second responses to determine a certificate expiration date;
determine whether automatic certificate renewal is authorized; and
if it is determined automatic renewal is authorized, automatically renew the certificate.

* * * * *